(12) United States Patent
Shenkar et al.

(10) Patent No.: US 8,237,703 B2
(45) Date of Patent: Aug. 7, 2012

(54) SPLIT-SCENE RENDERING OF A THREE-DIMENSIONAL MODEL

(75) Inventors: Victor Shenkar, Ramat Gan (IL); Yigal Eilam, Kiriat Ono (IL)

(73) Assignee: Geosim Systems Ltd., Petach Tikva (IL)

( * ) Notice: Subject to any disclaimer, the term of this patent is extended or adjusted under 35 U.S.C. 154(b) by 529 days.

(21) Appl. No.: 12/519,543

(22) PCT Filed: Dec. 20, 2007

(86) PCT No.: PCT/IL2007/001585
§ 371 (c)(1),
(2), (4) Date: Jun. 17, 2009

(87) PCT Pub. No.: WO2008/078321
PCT Pub. Date: Jul. 3, 2008

(65) Prior Publication Data
US 2010/0091014 A1    Apr. 15, 2010

Related U.S. Application Data

(60) Provisional application No. 60/876,471, filed on Dec. 22, 2006.

(51) Int. Cl.
*G06T 15/00* (2011.01)

(52) U.S. Cl. ........ 345/419; 345/581; 345/619; 345/621; 345/623; 345/625; 345/629; 345/630; 345/632; 345/660

(58) Field of Classification Search .......... 345/419–427, 345/581, 619–625, 629, 630, 632, 660
See application file for complete search history.

(56) References Cited

U.S. PATENT DOCUMENTS

| | | | |
|---|---|---|---|
| 5,130,794 A | 7/1992 | Ritchey | |
| 5,601,353 A | 2/1997 | Naimark et al. | |
| 6,118,414 A | 9/2000 | Kintz | |
| 7,148,896 B2 | 12/2006 | Han et al. | |
| 2009/0244072 A1 * | 10/2009 | Pugach et al. | 345/475 |

* cited by examiner

*Primary Examiner* — Xiao M. Wu
*Assistant Examiner* — Todd Buttram
(74) *Attorney, Agent, or Firm* — Daniel J. Swirsky; AlphaPatent Associates Ltd.

(57) ABSTRACT

A method for generating 3D visualization of a large-scale environment comprising the steps of: acquiring a 3D model of the large-scale environment; dividing the 3D model into a near-field part and a far-field part; rendering an array of images of the far-field part; creating a 3D visualization of the near-field part combined with the array of rendered images of the far-field part and displaying the combined rendered images.

12 Claims, 6 Drawing Sheets

SPLIT-SCENE RENDERING OF A THREE-DIMENSIONAL MODEL

CROSS-REFERENCE TO RELATED APPLICATIONS

This application is a U.S. National Phase Application under 35 U.S.C. 371 of PCT International Application No. PCT/IL2007/001585, which has an international filing date of Dec. 20, 2007, and which claims priority from provisional patent application No. U.S. 60/876,471, filed Dec. 22, 2006, the contents of which are hereby incorporated by reference.

FIELD AND BACKGROUND OF THE INVENTION

The present invention relates to computer generated visualization of three-dimensional ("3D") models and, more particularly, but not exclusively to communicating from a server, and visualizing on a remote terminal, a high-fidelity, 3D-model of a large-scale urban environment.

A high-fidelity 3D-model of a large-scale urban environment involves huge amounts of data. It is therefore advantageous to store the model in a server and communicate to a user-terminal only part of data that is needed to render a user selected view, rather than to pre-store the entire model at each terminal.

Processing the high-fidelity 3D-model of a large-scale urban environment to create the user selected view consumes a substantial amount of the processing power. It is therefore advantageous to process the selected view at each terminal, rather than at the server.

It is therefore advantageous to store the 3D-model in a network sever, to communicate the required part of the 3D-model to the terminal, and to render it on the terminal display.

However, communicating the required part of the 3D-model from the server to the terminal, even through a broadband communication channel may take a long time. This creates long delays until the user can see the selected view on his/her terminal.

There is thus a widely recognized need for, and it would be highly advantageous to have, a client-server 3D visualization system devoid of the above limitations.

SUMMARY OF THE INVENTION

According to one aspect of the present invention there is provided a method for generating three-dimensional (3D) visualization of a large-scale environment, the method including:
  acquiring a 3D model of the large-scale environment;
  dividing the 3D model into a near-field part and a far-field part;
  creating at least one rendered image representing perspective views of the far-field part;
  creating 3D visualization of the near-field part; and
  combining the 3D near-field visualization with at least one of the rendered images of the far-field part.

According to another aspect of the present invention there is provided a method for generating 3D visualization of a large-scale environment wherein the rendered images of the far-field part constitute a panoramic view of the far-field part of the large-scale environment.

According to still another aspect of the present invention there is provided a method for generating 3D visualization of a large-scale environment wherein the panoramic view is composed of an array of images spanning at least a part of a surface of a sphere ("panels").

According to yet another aspect of the present invention there is provided a method for generating 3D visualization of a large-scale environment wherein the panels are "flattened".

Further according to another aspect of the present invention there is provided a method for generating 3D visualization of a large-scale environment additionally including, before creating the rendered images of the far-field part, the step of eliminating objects included in the near-field part from the far-field part.

Even further according to another aspect of the present invention there is provided a method for generating 3D visualization of a large-scale environment additionally including, before dividing the 3D model into a near-field part and a far-field part, the steps of:
  determining a point of view; and
  determining length of a far-field radius;
  wherein the near-field part and the far-field part are divided by a surface defined according to the point of view and the far-field radius.

Further according to yet another aspect of the present invention there is provided a method for generating 3D visualization of a large-scale environment wherein the 3D model includes a plurality of 3D-modeling units, and wherein the step of dividing the 3D model into a near-field part and a far-field part includes locating at least one of the 3D-modeling units in the far-field part if, and only if, no point of the 3D-modeling unit is closer to the point of view than the far-field radius.

Further according to still another aspect of the present invention there is provided a method for generating 3D visualization of a large-scale environment wherein the 3D model includes a plurality of 3D-modeling units; and wherein the step of dividing the 3D model into a near-field part and a far-field part includes locating at least one of the 3D-modeling units in the far-field part if, and only if, no bounding-box vertices of the 3D-modeling unit is closer to the point of view than the far-field radius.

Also according to another aspect of the present invention there is provided a method for generating 3D visualization of a large-scale environment additionally including:
  determining a step factor, the step factor being smaller then the far-field radius;
  determining a plurality (a "matrix") of points of view, wherein the points of view are equally spaced at the step factor;
  creating a plurality of rendered images of the far-field part for each of the points of view; and
  storing the plurality the rendered images of the far-field parts for a later use.

Additionally, according to another aspect of the present invention there is provided a system for generating 3D visualization of a large-scale environment, the system comprising:
  a server comprising a 3D model of the large-scale environment; and
  a terminal device, communicating with the server, and operative to render an image of the large-scale environment on a display;
  wherein the server is operative to:
  divide the 3D model into a near-field part and a far-field part;
  create rendered images of the far-field part; and
  send to the terminal device the near-field part of the 3D model and the rendered images of the far-field part; and wherein the terminal device is operative to create 3D visualization of the near-field part combined with the rendered images of the far-field part.

Additionally, according to yet another aspect of the present invention there is provided a terminal device for 3D visualization of a large-scale environment, the terminal device comprising:
  a communication unit communicating with a server;
  a processing unit;
  a storage unit; and
  a display;
  wherein the processing unit is operative to receive from the server:
    a near-field part of the 3D model of the large-scale environment; and
    at least one rendered image of a far-field part of the 3D model of the large-scale environment; and
    to create 3D visualization of the near-field part combined with the rendered images of the far-field part and to display the combined rendered images on the display.

Additionally, according to still another aspect of the present invention there is provided a server for 3D visualization of a large-scale environment, the server comprising:
  a processing unit;
  a storage unit; and
  a communication unit communicating with a terminal device;
  wherein the processing unit is operative to:
  divide the 3D model into a near-field part and a far-field part;
  create rendered images of the far-field part; and
  send the near-field part of the 3D model and the rendered images of the far-field part to the terminal device.

Further according to another aspect of the present invention, there is provided a computer program product, stored on one or more computer-readable media, comprising instructions operative to cause a programmable processor of a terminal device to
  receive from a server:
    a near-field part of a 3D model of the large-scale environment; and
    rendered images of a far-field part of the 3D model of the large-scale environment; and
    create 3D visualization of the near-field part combined with the rendered images of the far-field part; and
    display the combined rendered images on the display.

Even further according to another aspect of the present invention there is provided a computer program product, stored on one or more computer-readable media, comprising instructions operative to cause a programmable processor of a server to:
  divide a 3D model into a near-field part and a far-field part;
  create rendered images of the far-field part; and
  send the near-field part of the 3D model and the rendered images of the far-field part to a terminal device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
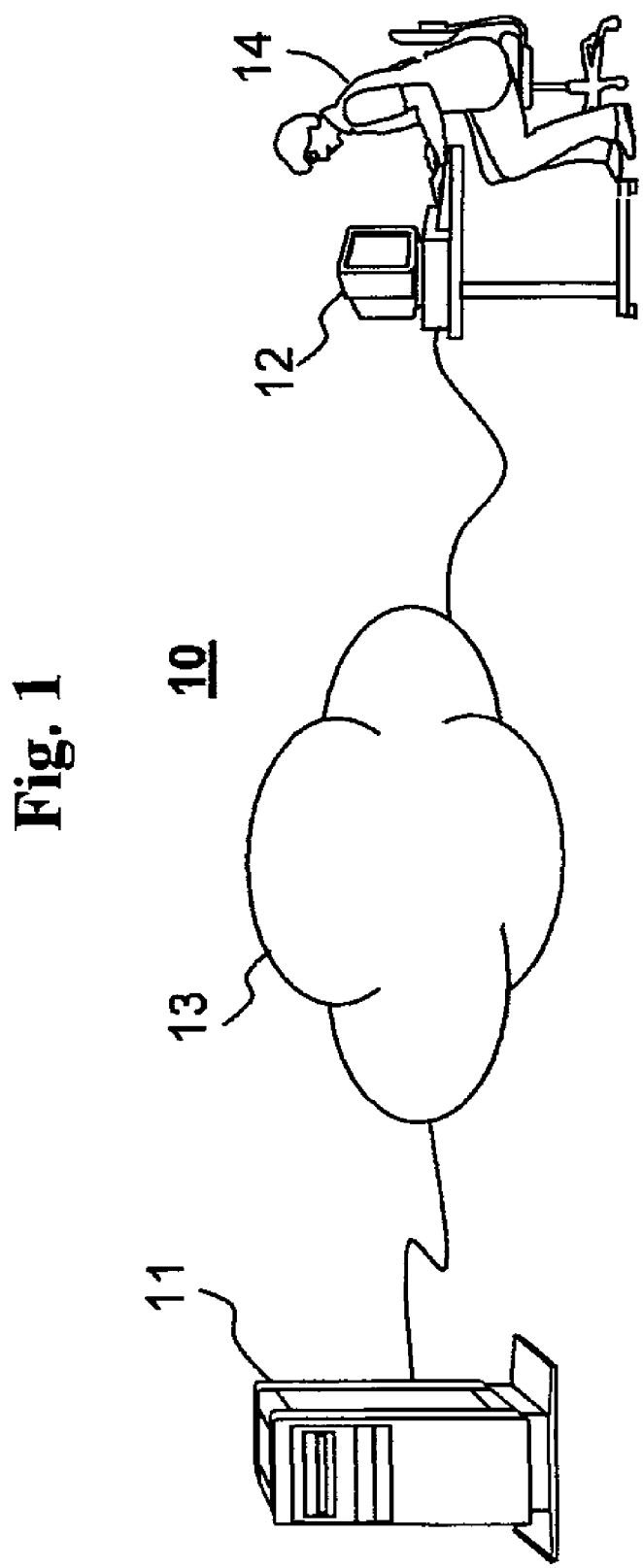
FIG. 1 is a simplified illustration of a client-server 3D visualization system, for visualizing a large scale environment, according to a preferred embodiment of the present invention.

The principles and operation of a 3D visualization system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text has the same use and description as in the previous drawings where it was described.

The 3D visualization system according to the present invention enables fast rendering of perspective views of a high-fidelity, large-scale 3D-model. In particular, the 3D visualization system is a client-server system, and the environment is a 3D-model of an urban environment. However, it is appreciated that the method described herein applies to any computing configuration, and to any type of 3D model incorporating a far-field view.

In this document, the term far-field, or far-field view, describes visualization of 3D objects that are far enough from the viewer so that their perspective does not change much as the viewer changes location of his/her point of view.

Reference is now made to FIG. 1, which is a simplified illustration of a client-server 3D visualization system 10 according to a preferred embodiment of the present invention.

The 3D visualization system 10 shown in FIG. 1 preferably includes a server 11 and one or more terminals 12, preferably connected to the server via a network 13. Preferably, a user 14 uses the terminal 12 to watch a perspective view of a large-scale environment on the terminal's display.

It is appreciated that the terminal 12 can be any type of display terminal, such as a desk-top computer, a lap-top computer, palm-top computer, a PDA, a cellular telephone, etc.

It is appreciated that the network 13 can be any type of communication network, such as a personal area network (PAN), local area network (LAN), metropolitan area network (MAN), wide area network (WAN), wired data transmission, wireless data transmission, and combinations thereof.

Figure 2:
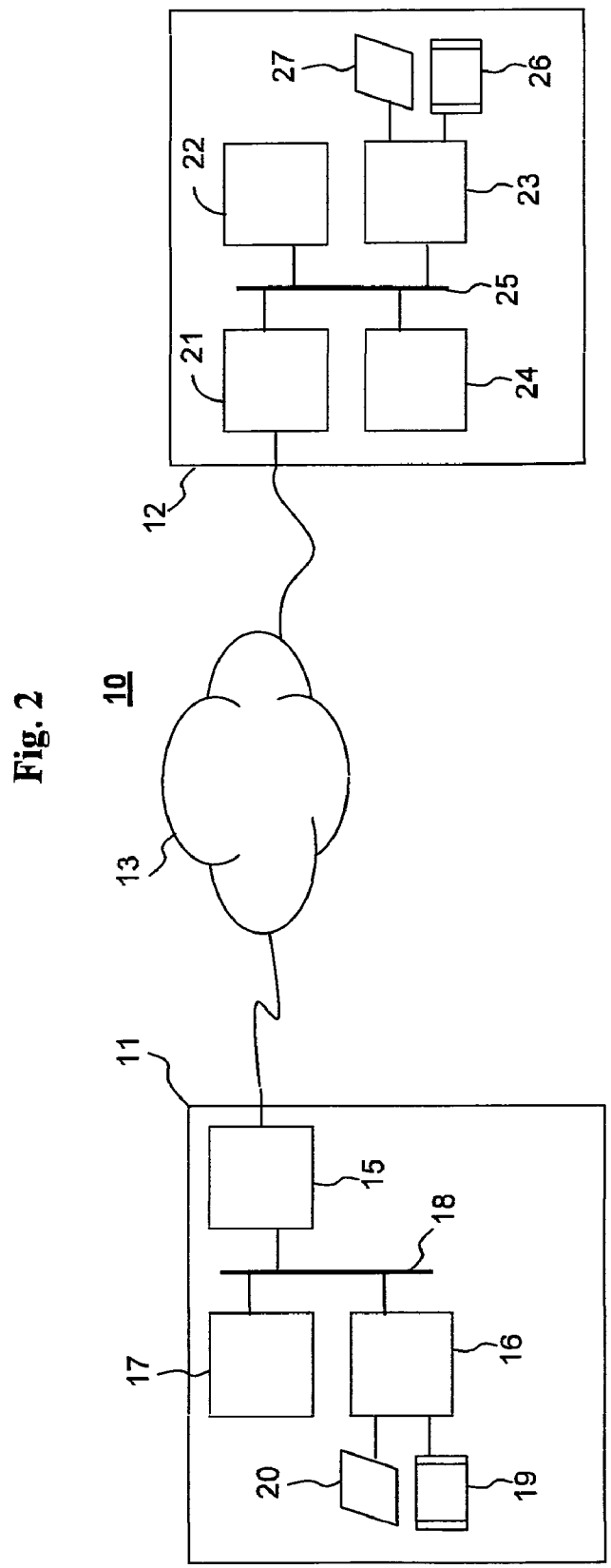
FIG. 2 is a simplified block diagram of the client-server 3D visualization system according to a preferred embodiment of the present invention.

Reference is now made to FIG. 2, which is a simplified block diagram of the client-server 3D visualization system 10 according to a preferred embodiment of the present invention.

The server 11 preferably contains a communication unit 15 connected to the network 13, a storage and/or memory unit 16, and a processing unit 17, which is capable of processing a 3D-model, rendering a required image and streaming required parts of the 3D-model. The communication unit 15, the storage/memory unit 16 and the processing unit 17 are preferably interconnected, preferably via a bus 18. A server program 19 and a 3D model 20 are preferably stored in the storage/memory unit 16.

The terminal 12 preferably contains a terminal communication unit 21 connected to the network 13, a display 22, a storage and/or memory unit 23, and a processor 24 capable of processing rendered images and required parts of the 3D-model and rendering a required image on the terminal's display 22.

The communication unit 21, the display 22, the storage/memory unit 23 and the processing unit 24 are preferably interconnected, preferably via a bus 25. A server program 26 and a 3D-model 27 are preferably stored in the storage/memory unit 23.

It is appreciated that the 3D-model 27 can be a 'file cached model' containing rendered images and 3D-model items, parts and components that are saved in the storage/memory unit 23 from session to session.

Figure 3:
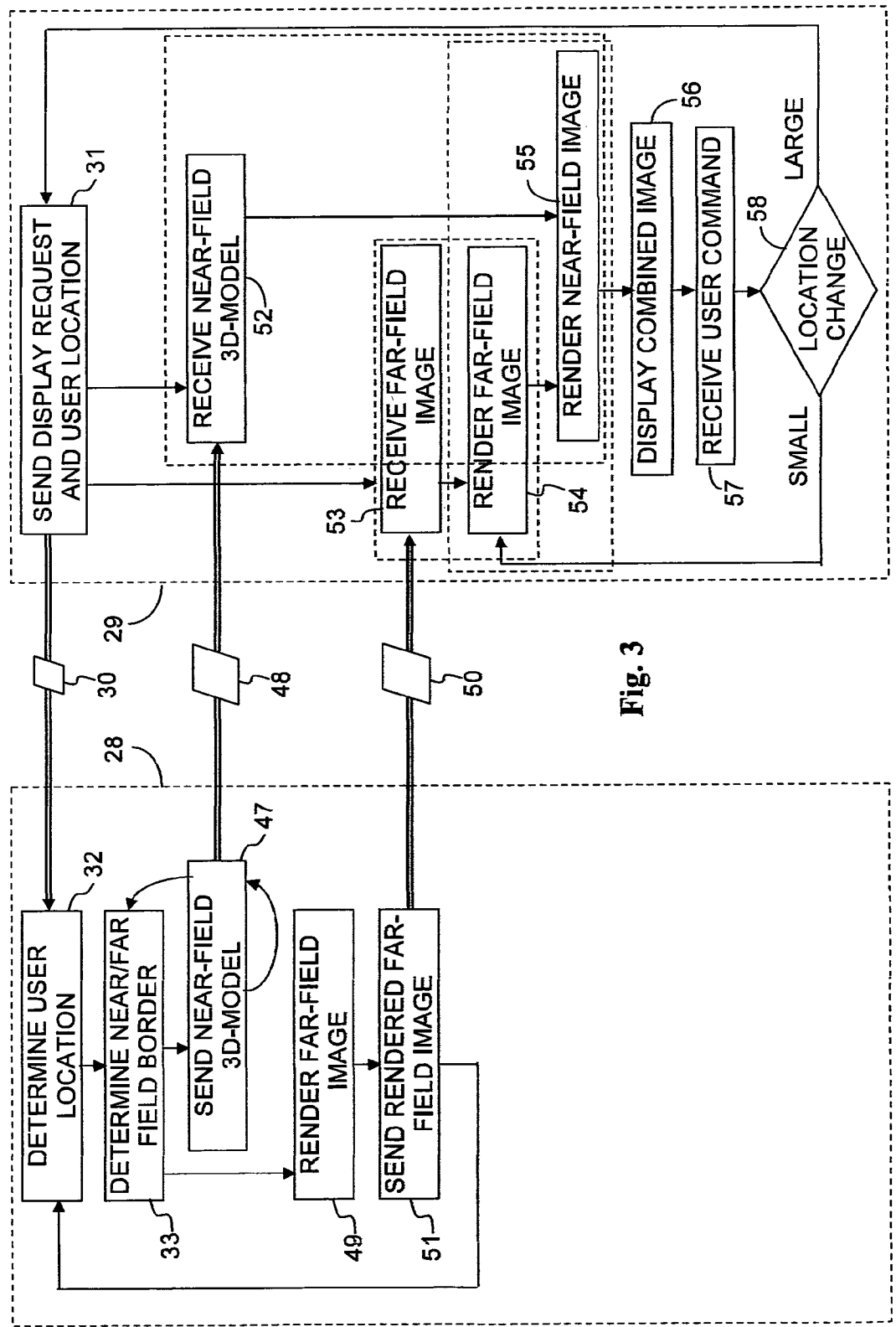
FIG. 3 is a simplified flow chart of a server process and a terminal process executed, respectively, by a server and a terminal of the client-server 3D visualization system, according to a preferred embodiment of the present invention.

Reference is now made to FIG. 3, which is a simplified flow chart of a server process 28, and a terminal process 29, executed by the server 11, and the terminal 12, respectively, according to a preferred embodiment of the present invention.

Preferably, the processes 28 and 29 are respectively stored in the storage/memory units 16 and 23, and executed by the processors 17 and 24.

Preferably, the terminal process 29 starts by sending a display request 30 to the server process 28 (step 31). Preferably, the display request 30 contains user location information (such as coordinates) and orientation information (such as viewing direction). The user location and orientation information refers to a virtual location within a 3D large-scale model of an environment, preferably an urban environment. The user positions him/her in the specified location and requests the 3D visualization system 10 to display a perspective view of the environment according to the specified location and orientation.

Alternatively, the display request 30 contains requests for specific components of the 3D-model that the terminal process requires to generate a perspective view of the environment according to the specified location and orientation.

The server process 28 preferably starts with step 32 to receive the display request 30 and to determine the user's location, and, preferably, the user's orientation, preferably based on the information contained within the display request 30.

The server preferably proceeds to step 33 to determine a border separating between a near-field zone and a far-field zone.

Figure 4:
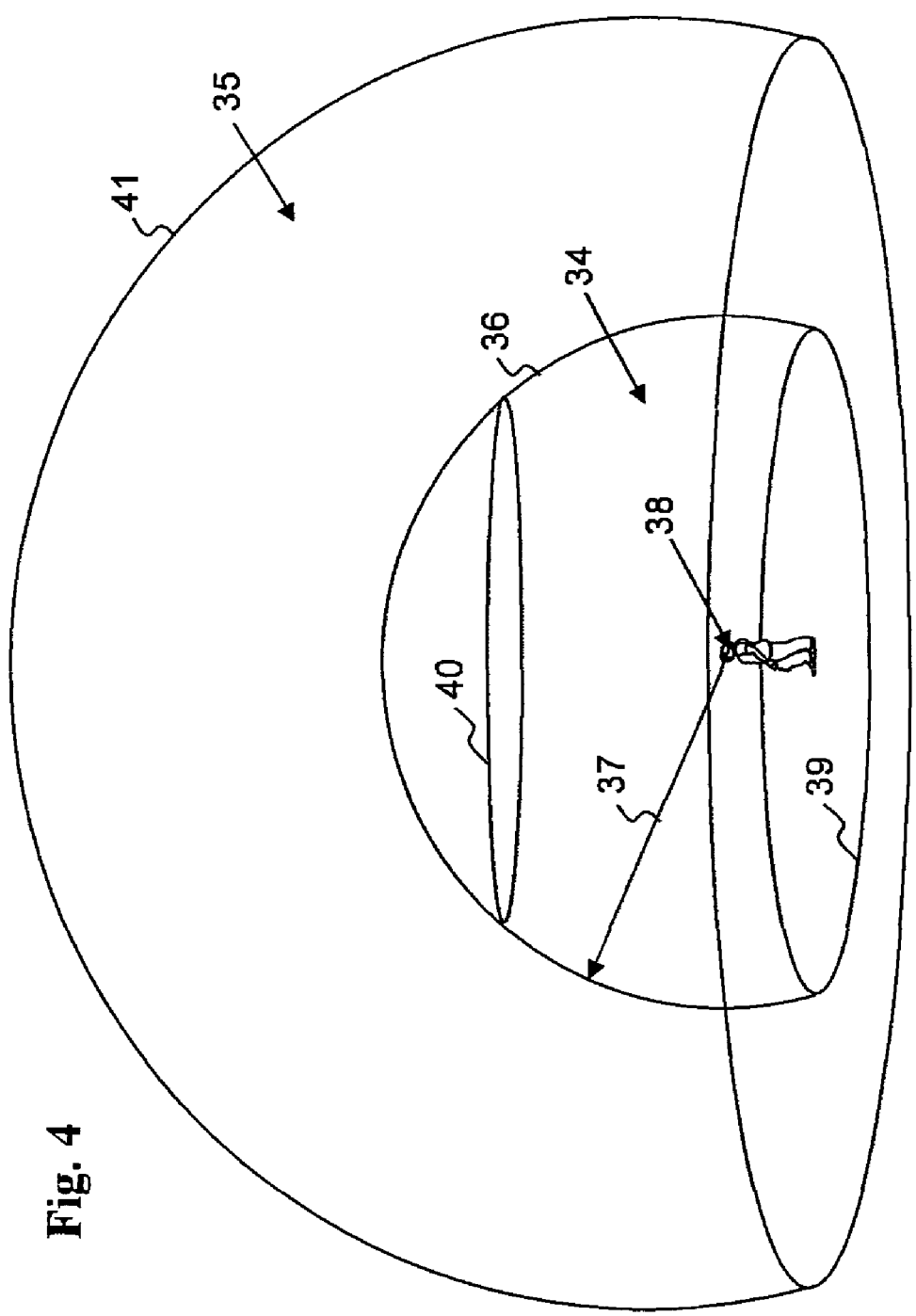
FIG. 4 is a simplified illustration of a near-field zone, a far-field zone, and a separation border between, according to a preferred embodiment of the present invention.

Reference is now made to FIG. 4, which is a simplified illustration of a near-field zone 34, and a far-field zone 35, and a separation border 36 between, according to a preferred embodiment of the present invention.

In is document the term near-field, or near-field view, describes visualization of 3D objects that are close to the viewer so that their perspective does change significantly as the viewer slightly changes location of his/her point of view. The near-field zone and the far-field zone together define the scope (or the area, or the volume) of the environment for which a large-scale 3D-model applies. Therefore, and accordingly, the large-scale 3D-model is also divided into a near-filed part and a far-field part.

Preferably, the near-field zone 34 is a truncated sphere of a certain radius 37 around the virtual location 38 within the large-scale 3D-model. Preferably, the virtual location 38 is the location of a user, i.e. represents the point of view of the user 14. The near-field zone 34 is defined by the X, Y and Z parameters of the location 38, by the radius 37 and optionally and additionally by one or more surfaces that truncate the sphere. Such surfaces can be a ground surface 39 and a "sky" surface 40. The far-field zone 35 extends from the separation border 36 to the horizon 41.

Figure 5:
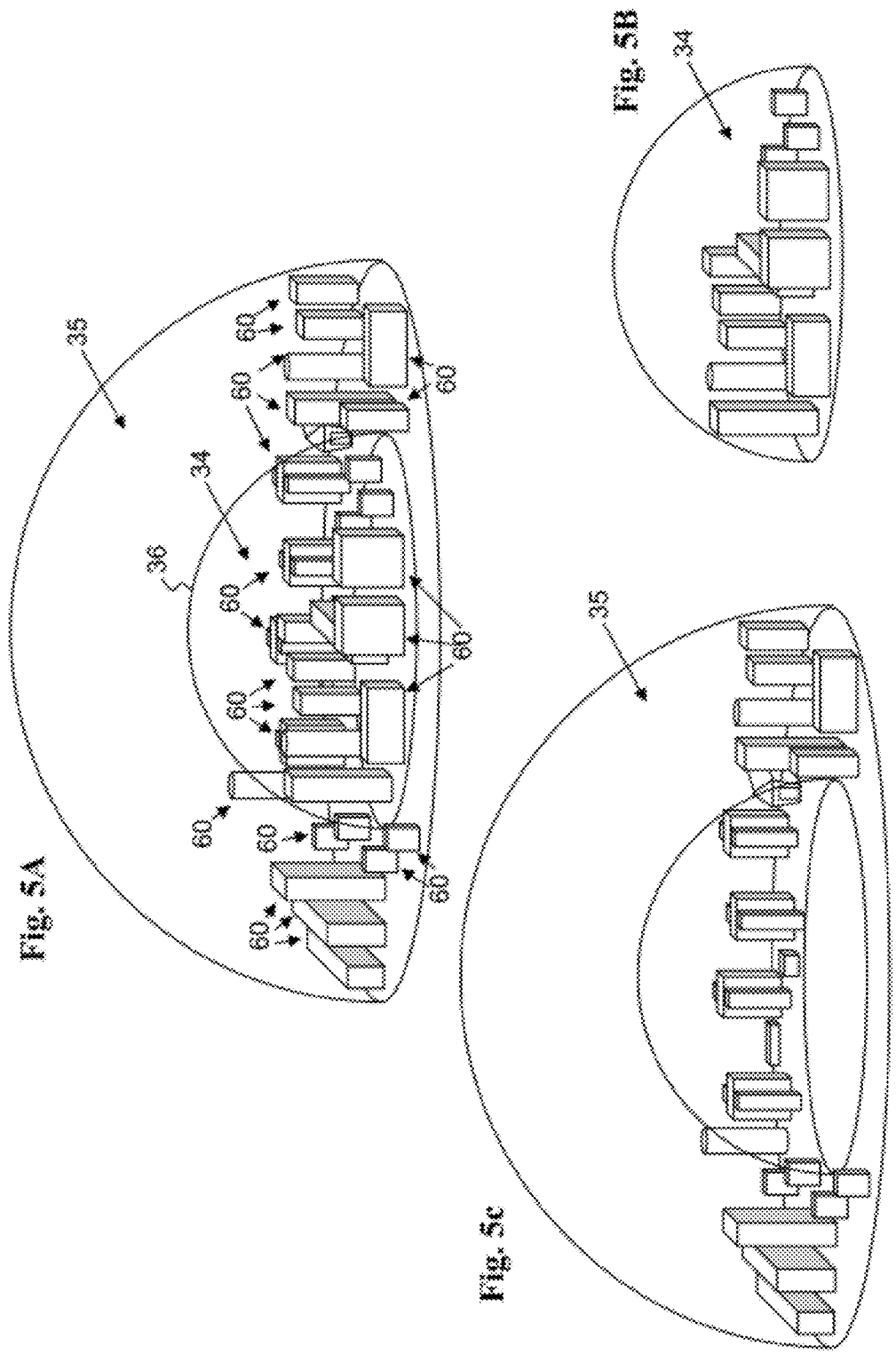
FIGS. 5A. 5B and 5C are simplified illustrations of an urban environment divided into a near-field zone and a far-field zone according to a preferred embodiment of the present invention.

Reference is now made to FIGS. 5A. 5B and 5C, which are simplified illustrations of an urban environment divided into a near-field zone 34 and a far-field zone 35 according to a preferred embodiment of the present invention. FIG. 5A shows the urban environment including both the near-field zone 34 and the far-field zone 35, FIG. 5B shows the near-field zone 34 separated from the far-field zone 35. FIG. 5C shows the far-field zone 35 separated from the near-field zone 34.

Figure 6:
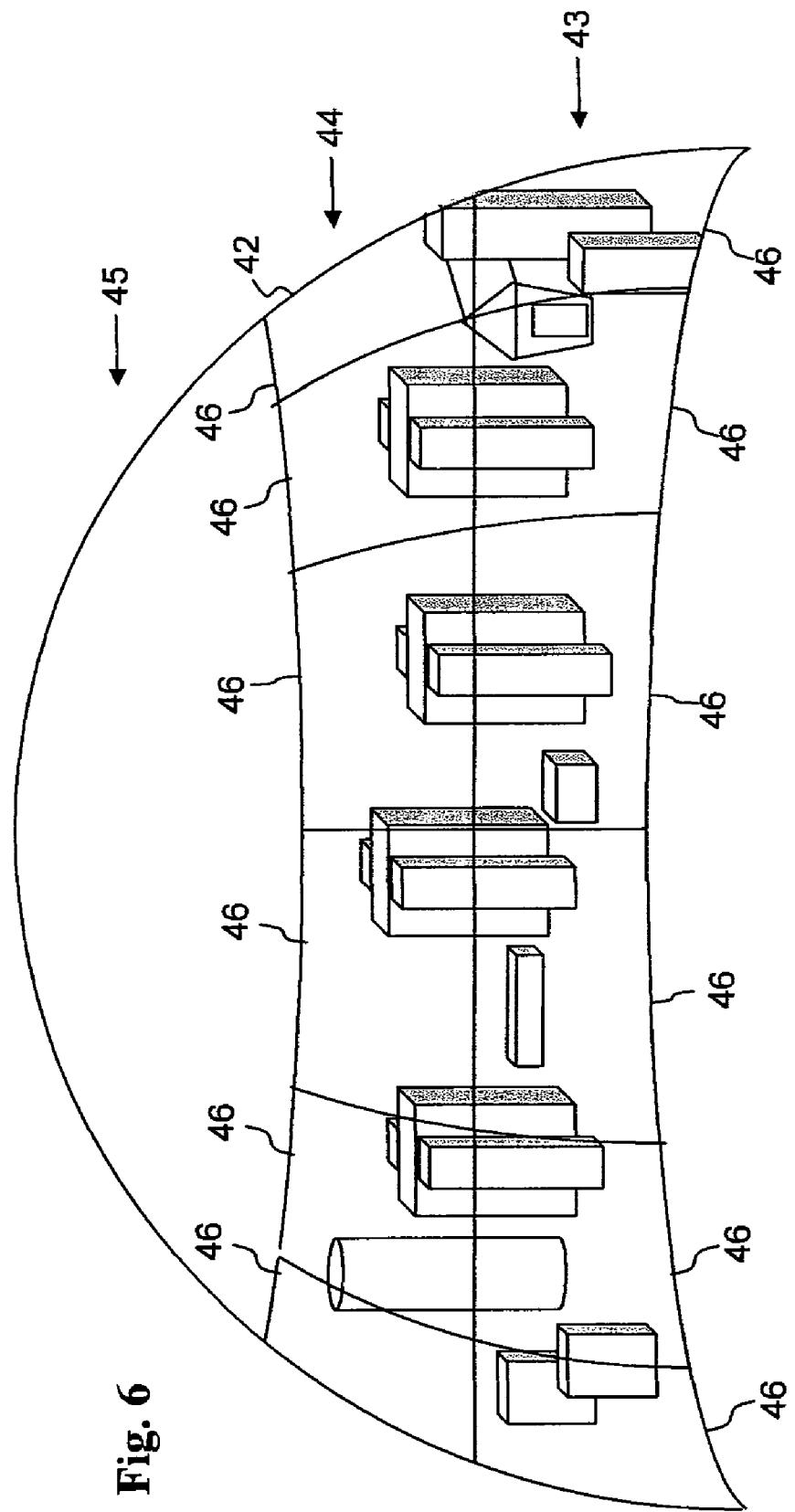
FIG. 6 is a simplified illustration of a panoramic view of the far-field zone projected on a surface of a sphere according to a preferred embodiment of the present invention.

Reference is now made to FIG. 6, which is a simplified illustration of a panoramic view 42 of the far-field zone 35 projected on a surface of a sphere according to a preferred embodiment of the present invention. FIG. 6 shows a part of the panoramic view 42.

Preferably, the panoramic view 42 is a spherical projection of the 3D-model of the far-field zone 35. Preferably, the panoramic view 42 is projected from the virtual location 38 on a surface of a truncated sphere, which, preferably, is the surface of the near-field zone 35, or a part thereof.

Preferably, this spherical projection is divided into a predefined number of panels. In one preferred embodiment of the present invention, the panels are "flattened". In an alternative and more preferred embodiment of the present invention the panels are concave being part of the surface of truncated sphere, preferably, the surface of the near-field zone 35. In one preferred embodiment of the present invention, the truncated sphere is divided into two rows of panels 43 and 44, and a cap 45 (of which one half is shown in FIG. 6). Preferably, each row contains twelve panels 46 (of which six are shown in FIG. 6) with the cap representing the sky. In an alternative and preferred embodiment of the present invention the panoramic view 42 covers truncated sphere that is cap-less, i.e. truncated also on its top side. Preferably, the sky view is added synthetically at the terminal 12. Optionally and preferably, the upper row 44 is rendered at lower resolution than the lower row 43 to further reduce the file size representing the panoramic view 42.

Turning back to FIG. 3, in step 33 the server processes 28 determines the separation border 36, or the radius 37 of the near-field zone 34. Typically, the radius 37 is set at 200 meters. It is appreciated that any radius can be determined according to the circumstances as will be discusses below. It is also appreciated that the process of determining the radius 37 can be performed by the terminal process 29, which then sends the magnitude of the radius 37 to the server process 28, preferably as a part of the display request 30.

Alternatively, the separation border 36 is determined according to the items, parts and components part, or components, of the 3D-model 27 that are already transmitted to or cached within, the terminal 12. The part of the 3D-model 27 that is already in the terminal 12 is considered near-field, and the rest of the 3D-model 27 is considered far-field. It is appreciated that either the server 11 knows which units the terminal 12 has, or the terminal 12 sends informs the server regarding the as part of the 3D-model 27 it already has, preferably as a part of the display request 30

The server process 28 preferably proceeds to step 47, in which the server 11 starts streaming to the terminal 12 a 3D-model 48 of the near-field zone 34. Preferably, the 3D-model 48 of the near-field zone 34 is a near-field part of the large-scale 3D, which is defined for the large-scale environment, which includes the combined near-field and far-field zones.

Preferably, the 3D-model of the urban environment of FIG. 5A contains a plurality of 3D-modeling units associated with structures 60 of the urban environment of FIG. 5A. Preferably, the step of dividing the large-scale 3D-model into a near-field part and a far-field part includes distributing the 3D-modeling units between the zones. Preferably, a 3D-modeling unit is located within the far-field part if, and only if, no point of the 3D-modeling unit is closer to the point of view than the far-field radius. Alternatively, a 3D-modeling unit is located within the far-field part if, and only if, no bounding-box vertices of the 3D-modeling unit are closer to the point of view than the far-field radius.

The server process 28 preferably proceeds to step 49, preferably in parallel to step 47, to render an image 50 of the far-field 35. Preferably, the rendered image 50 of the far-field 35 is rendered from a far-field part of the large-scale 3D-model of the large-scale environment defined by the combined near-field and far-field zones.

Preferably the image 50 is rendered in the form of an array of panels, such as 24 panels arranged in two rows of 12 panels each and a sky cap, as described in accordance with FIG. 6.

The server process 28 preferably proceeds to step 51 to send the rendered image 50 to the terminal 12.

After sending the display request 30 in step 31, the terminal process 29 preferably proceeds to step 52 to receive the near-field 3D-model 48 from the server 11 and to step 53 to receive the rendered far-field image 52 from the server 11. Preferably steps 52 and 53 are performed in parallel.

The terminal process 29 preferably proceeds to step 54 to render the far-field image 50, preferably, a part of the rendered far-field image 50 according to the virtual location and orientation of the user, and to step 55 to perform image rendering of the near-field 3D-model 48 according to the location and orientation of the user.

The terminal process 29 preferably proceeds to step 56 to display the combined rendering of the near-filed and the far-field on the terminal's display, preferably the near-field image superimposed on a corresponding far-field image.

The terminal process 29 preferably proceeds to step 57 to receive user commands and, according to step 58, if the location change is small, to repeat steps 53 to 57, and if the location change is large, to return to step 31.

Typically, the location change is reported to the server when the location change reaches a predefined percent of the radius 37, for example, 10%. The server process 28 preferably repeats steps 33 to 51 to render a new image of the far-field zone and to communicate it to the terminal.

The main considerations in determining the radius 37 (step 33) are:

The larger the radius the larger is the size of the 3D-model part of the near-field zone 34 and the longer it takes to communicate it to the terminal.

A smaller radius requires more frequent update of the rendered images of the far-field zone from the server to the terminal.

It is appreciated that the server can prepare and store in advance a set of rendered far-field images, and communicate the relevant far-field images as required. Preferably, this set of rendered far-field images forms an array of partially overlapping far-field images, typically centered at grid points set apart at the distance at which the rendered far-field images have to be updated. For example, such grid points are set apart at 10% of the radius 37.

It is appreciated that the server process 28 can start with a relatively small near-field zone and then to continue and to expand the near-field zone, sending additional portions of the large-scale 3D-model to the terminal process 29. Optionally and preferably the server process 28 can continue rendering and sending new far-field images conforming to a further separation border according to the communicated 3D-model.

It is appreciated that the server can store several sets of rendered far-field images, each set conforming to a different size of the radius 37. The server can start streaming parts of the large-scale 3D-model contained within a small radius 37 together with the corresponding rendered far-field image, retrieved from the appropriate set of rendered far-field images. The server continues to send 3D-model data to the terminal and as the user changes his/her virtual location, the server sends appropriate rendered far-field images from the same set. Later, as the communicated 3D-model covers a larger radius the server can start streaming a set of rendered far-field images corresponding to a larger radius 37.

It is expected that during the life of this patent many relevant 3D visualization systems will be developed, and the scope of the terms herein, particularly of the terms "terminal device" and "server", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for generating 3D visualization of a large-scale environment, the method comprising:
   acquiring a 3D model of said large-scale environment;
   determining a point of view;
   determining a far-field radius;
   dividing said 3D model into a near-field part and a far-field part, wherein said near-field part and said far-field part are divided by a surface defined according to said point of view and said far-field radius;
   creating at least one rendered image representing at least one perspective view of said far-field part; and
   creating 3D visualization of said near-field part combined with said at least one rendered images of said far-field part,
   wherein said 3D model comprises a plurality of 3D-modeling units, and
   wherein said step of dividing said 3D model into a near-field part and a far-field part comprises locating at least one of said 3D-modeling units in said far-field part if, and only if, no point of said 3D-modeling unit is closer to said point of view than said far-field radius.

2. A method for generating 3D visualization according to claim 1 wherein said rendered images of said far-field part constitute a panoramic view of said far-field part of said large-scale environment.

3. A method for generating 3D visualization according to claim 2 wherein said panoramic view comprises an array of images ("panels") projected on at least a part of a surface of a sphere.

4. A method for generating 3D visualization according to claim 3 wherein said panels are flattened.

5. A method for generating 3D visualization according to claim 2 wherein said panoramic view comprises a plurality of two-dimensional panels arranged to form at least a part of a surface of a sphere.

6. A method for displaying a 3D view according to claim 1 additionally comprising, before creating rendered images of said far-field part:
   eliminating 3D-objects included in said near-field part from said far-field part.

7. A method for generating 3D visualization according to claim 1 additionally comprising:
   determining a step factor, said step factor being smaller then said far-field radius;
   determining a plurality (a "matrix") of points of view, wherein said points of view are equally spaced at said step factor;
   creating a plurality of rendered images of said far-field part for each of said points of view; and
   storing said plurality of rendered images of said far-field parts for a later use.

8. A system for 3D visualization of a large-scale environment, the system comprising:
   a server comprising a 3D model of the large-scale environment; and
   a terminal device, communicating with said server, and operative to render an image of said large-scale environment,
   wherein said server is operative to
      determine a point of view,
      determine a far-field radius,
      divide said 3D model into a near-field part and a far-field part, wherein said near-field part and said far-field part are divided by a surface defined according to said point of view and said far-field radius,
      create rendered images of said far-field part, and
      send to said terminal device said near-field part of said 3D model and said rendered images of said far-field part,
   wherein said terminal device is operative to create 3D visualization of said near-field part combined with said rendered images of said far-field part,
   wherein said 3D model comprises a plurality of 3D-modeling units, and
   wherein dividing said 3D model into a near-field part and a far-field part comprises locating at least one of said 3D-modeling units in said far-field part if, and only if, no point of said 3D-modeling unit is closer to said point of view than said far-field radius.

9. A terminal device for 3D visualization of a large-scale environment, the terminal device comprising:
   a communication unit communicating with a server;
   a processing unit;
   a storage unit; and
   a display,
   wherein said processing unit is operative to
      receive from said server
         a near-field part of a 3D model of said large-scale environment, and
         rendered images of a far-field part of said 3D model of said large-scale environment, and
      create 3D visualization of said near-field part combined with said rendered images of said far-field part,
   wherein said 3D model comprises a plurality of 3D-modeling units, and
   wherein dividing said 3D model into a near-field part and a far-field part includes
      determining a point of view,
      determining a far-field radius, and
      locating at least one of said 3D-modeling units in said far-field part if, and only if, no point of said 3D-modeling unit is closer to said point of view than said far-field radius.

10. A server for 3D visualization of a large-scale environment, the server comprising:
   a processing unit;
   a storage unit; and
   a communication unit communicating with a terminal device,
   wherein said server is operative to:

divide said 3D model into a near-field part and a far-field part, create an array of rendered images of said far-field part, and send said near-field part of said 3D model and said array of rendered images of said far-field part to said terminal device, wherein said 3D model comprises a plurality of 3D-modeling units, and wherein dividing said 3D model into a near-field part and a far-field part includes determining a point of view, determining a far-field radius, and locating at least one of said 3D-modeling units in said far-field part if, and only if, no point of said 3D-modeling unit is closer to said point of view than said far-field radius.

11. A computer program product comprising:

non-transitory, computer-readable media; and computer-readable instructions stored on said non-transitory, computer-readable media, and operative to cause a programmable processor to receive from a server:

a near-field part of a 3D model of said large-scale environment; and an array of rendered images of a far-field part of said 3D model of said large-scale environment, and create 3D visualization of said near-field part combined with said rendered images of said far-field part, wherein said 3D model comprises a plurality of 3D-modeling units, and wherein dividing said 3D model into a near-field part and a far-field part includes determining a point of view, determining a far-field radius, and locating at least one of said 3D-modeling units in said far-field part if, and only if, no point of said 3D-modeling unit is closer to said point of view than said far-field radius.

12. A computer program product comprising:

non-transitory, computer-readable media; and computer-readable instructions stored on said non-transitory, computer-readable media, and operative to cause a programmable processor to divide a 3D model into a near-field part and a far-field part, create an array of images of said far-field part, and send said near-field part of said 3D model and said array of rendered images of said far-field part to a terminal device, wherein said 3D model comprises a plurality of 3D-modeling units, and wherein dividing said 3D model into a near-field part and a far-field part includes determining a point of view, determining a far-field radius, and locating at least one of said 3D-modeling units in said far-field part if, and only if, no point of said 3D-modeling unit is closer to said point of view than said far-field radius.

\* \* \* \* \*